UNITED STATES PATENT OFFICE.

WILLIAM H. WINKLEY, OF LOS ANGELES, CALIFORNIA.

HEAT-INSULATING MATERIAL AND PROCESS OF MAKING THE SAME.

1,332,370.     Specification of Letters Patent.     Patented Mar. 2, 1920.

No Drawing.     Application filed August 14, 1919. Serial No. 317,605.

*To all whom it may concern:*

Be it known that I, WILLIAM H. WINKLEY, a citizen of the United States, and a resident of Los Angeles, county of Los Angeles, State of California, have invented a certain new and useful Heat-Insulating Material and Processes of Making the Same, of which the following is a specification.

The invention relates to heat insulating material and to a mortar for binding together blocks of heat insulating material and is composed chiefly of insulating earth, such as infusorial or diatomaceous earth.

An object of the invention is to provide a heat insulating material which may be molded or applied in plastic form and which will not check or crack upon drying or baking.

Another object of the invention is to provide a dry mixture of materials which may be transported or stored without undergoing change and which, when mixed with water forms a heat insulating mortar for holding together blocks of insulating earth material.

The invention possesses other advantageous features, some of which, with the foregoing, will be set forth at length in the following description where I shall outline in full one form of the material and process of my invention.

Insulating earths, such as diatomaceous or infusorial earths, contain silica which is soluble in alkali solutions, such as solutions of sodium or potassium hydroxid or carbonate, producing sodium or potassium silicates, which upon drying or hardening cements the pieces or particles of the insulating earth together. Obviously an alkali solution cannot be used to cement blocks of insulating earth together and I propose to form a mortar composed chiefly of finely divided insulating earth, to be used in setting the blocks of insulating earth. It is advisable that the materials for forming the mortar be mixed together in the dry state and packaged so that it may be readily transported to the locality at which it is to be used. The dry mixture is preferably such that when mixed with water, the desired mortar is formed. This mixture is ordinarily packed in sacks in the same manner as Portland cement.

The alkali employed heretofore in the mixture has been caustic soda, but caustic soda is deliquescent, with the result that when packed in sacks, the mixture absorbs water from the atmosphere and becomes a wet mass which is extremely difficult to handle and practically impossible to transport. In accordance with my invention I add to the ground or finely divided insulating earth, a mixture of materials which are not deliquescent and which when mixed with water undergo a reaction, producing the desired alkali. The materials which I prefer to employ are sodium carbonate, preferably in the form of soda ash and hydrated lime. When water is added a reaction takes place, which is complete in about thirty minutes, producing caustic soda.

The use of the alkali solution alone, with the finely divided insulating earth, produces a heat insulating material which checks and cracks on drying and which has substantially the same heat insulating properties as the heat insulating rock from which it is made. To overcome these features, I employ, in conjunction with the alkali, a colloidal adhesive material which greatly decreases in volume upon drying and which is of a pasty nature, so that a rather large proportion of it may be mixed with the earth without making the mass too liquid for proper handling or molding. Any material having binding properties and which shrinks to a very great extent on drying, may be employed and I propose to use either starch or rye flour, but preferably starch. The starch is gelatinized by mixing it with the alkali solution or by adding water to a mixture of the alkali and starch.

The proportions of the ingredients entering into the mixture vary with the conditions of the insulating earth and other factors, but I have had excellent results with a mixture consisting of about 85 parts by weight of insulating earth, approximately 10 parts of starch by weight and about 5 parts of soda ash and two parts hydrated lime, both by weight, to which sufficient water is added to make the whole mass plastic.

The plastic material thus formed, may be used as a mortar in which blocks of heat insulating rock are set or it may be placed in molds for baking or may be applied to steam boilers or other devices which it is desirable to heat insulate. When applied to steam boilers or steam pipes in the plastic condition, the material is dried out at a temperature which causes the starch to shrink to its original volume, leaving myriads of air cells and the particles of earth are cemented together and held in place by the alkali silicate. The gelatinized starch is thoroughly disseminated throughout the mass and the great shrinkage of the starch particles on drying produces myriads of air cells, which produces a porous heat insulating material. When it is desirable to manufacture this material into standard shapes, the plastic mixture is placed in molds and dried and hardened. When the material is heated to 300° F. or above, the starch is converted into dextrin which is a strong adhesive and if the temperature is raised higher, the dextrin is carbonized.

The dry mixture which will be transported will preferably consist of heat insulalating earth, starch, soda ash and hydrated lime. The addition of water causes the formation of caustic soda which dissolves some of the silicate and which gelatinizes the starch.

The plastic mixture thus produced forms an excellent mortar for binding together blocks of heat insulating rock or for binding the blocks to any surface and may be used in plastic form as a heat insulator or may be molded into commercial shapes.

I claim:

1. A heat insulating material formed from a mixture composed mainly of heat insulating earth, sodium carbonate, hydrated lime, starch and water.

2. A heat insulating material formed from a mixture composed mainly of heat insulating earth, starch, materials which when mixed with water react to form an alkali and water.

3. A heat insulating material formed from a mixture composed mainly of heat insulating earth, a material which when wet is a colloidal adhesive and which shrinks on drying, materials which when mixed with water react to form an alkali capable of combining with a portion of the insulating earth to form an alkali silicate, and water.

4. A dry mixture which when mixed with water forms a plastic heat insulating material consisting mainly of a mixture of heat insulating earth, a material which when gelatinized is a colloidal adhesive which shrinks on drying and a mixture of materials which when wet react to form an alkali capable of combining with a portion of the insulating earth to form an alkali silicate.

5. A dry mixture which when mixed with water forms a plastic heat insulating material consisting mainly of a mixture of heat insulating earth, starch and materials which when wet with water react to form an alkali capable of combining with a portion of the insulating earth to form an alkali silicate.

6. A dry mixture which when mixed with water forms a plastic heat insulating material consisting mainly of a mixture of heat insulating earth, starch, sodium carbonate and hydrated lime.

7. A dry mixture which when mixed with water forms a plastic heat insulating material comprising a mixture of heat insulating earth and materials which when wet with water react to form an alkali capable of combining with a portion of the insulating earth to form an alkali silicate.

8. The method of making heat insulating material which consists in mixing heat insulating earth with a material which when gelatinized is a colloidal adhesive which shrinks on drying and a mixture of materials which when wet with water form an alkali and sufficient water to make a plastic mass.

9. The method of making heat insulating material which consists in mixing with water, heat insulating earth, starch and materials which when wet with water react to form an alkali capable of combining with a portion of the insulating earth to form an alkali silicate.

10. The method of making heat insulating material which consists in mixing heat insulating earth, starch, sodium carbonate and hydrated lime with water.

11. The method of making heat insulating material which consists in mixing heat insulating earth with materials which when wet with water form an alkali capable of combining with a portion of the insulating earth to form an alkali silicate, and water.

In testimony whereof I have hereunto set my hand at San Francisco, California, this 8th day of August, 1919.

WILLIAM H. WINKLEY.

In presence of—

W. W. HEALEY.